US006609304B1

(12) United States Patent
Mishler (10) Patent No.: US 6,609,304 B1
(45) Date of Patent: Aug. 26, 2003

(54) TWO-DIMENSIONAL MOVING SYSTEM (75) Inventor: Mike Mishler, Schaumburg, IL (US)

(73) Assignees: TKH Co., Ltd., Tokyo (JP); THK America, Inc., Schaumberg, IL (US)

( * ) Notice: Subject to any disclaimer, the term of this patent is extended or adjusted under 35 U.S.C. 154(b) by 115 days.

(21) Appl. No.: 09/634,864

(22) Filed: Aug. 8, 2000

(51) Int. Cl.$^7$ ................................................ G01B 5/00
(52) U.S. Cl. ........................................ 33/1 M; 33/706
(58) Field of Search ......................... 33/1 M, 430, 436, 33/441, 443, 444, 503, 706, 707, 708

(56) References Cited

U.S. PATENT DOCUMENTS

| | | | | |
|---|---|---|---|---|
| 3,495,519 A | * | 2/1970 | Alfsen et al. ............... | 33/1 M |
| 4,419,823 A | * | 12/1983 | Thorban ..................... | 33/1 M |
| 4,995,277 A | * | 2/1991 | Yanagisawa ................. | 33/1 M |
| 5,326,335 A | * | 7/1994 | Takei ......................... | 33/1 M |
| 5,363,774 A | * | 11/1994 | Anada et al. ................ | 33/1 M |
| 6,049,988 A | * | 4/2000 | Shirai ........................ | 33/1 M |
| 6,327,929 B1 | * | 12/2001 | Yanagisawa ................. | 33/1 M |
| 6,495,935 B1 | * | 12/2002 | Mishler ...................... | 310/12 |

FOREIGN PATENT DOCUMENTS

JP          58-198369          11/1983

* cited by examiner

*Primary Examiner*—Diego Gutierrez
*Assistant Examiner*—Madeline Gonzalez
(74) *Attorney, Agent, or Firm*—Armstrong, Westerman & Hattori, LLP.

(57) ABSTRACT

A two-dimensional moving system for moving a table in a plane comprises a table, a guide mechanism for guiding the table to be movable in the plane, first and second belts which are connected to the table so as to intersect to each other at substantially right angles, first driving mechanism for driving the first belt so as to move the table in a longitudinal direction of the first belt and to allow the first belt to be movable in a longitudinal direction of the second belt, and a second driving mechanism for driving the second belt so as to move the table in the longitudinal direction of the second belt and to allow the second belt to be movable in the longitudinal direction of the first belt.

9 Claims, 10 Drawing Sheets

TWO-DIMENSIONAL MOVING SYSTEM

BACKGROUND OF THE INVENTION

1. Field of the Invention

The present invention relates to a two-dimensional moving system for moving a table two dimensionally in a plane, such as X-Y table, in which a table is movable in an X (lateral) direction and a Y (longitudinal) direction, or a X-Z table in which a table is movable in the X direction and a Z (vertical) direction.

2. Related Art

Figure 11:
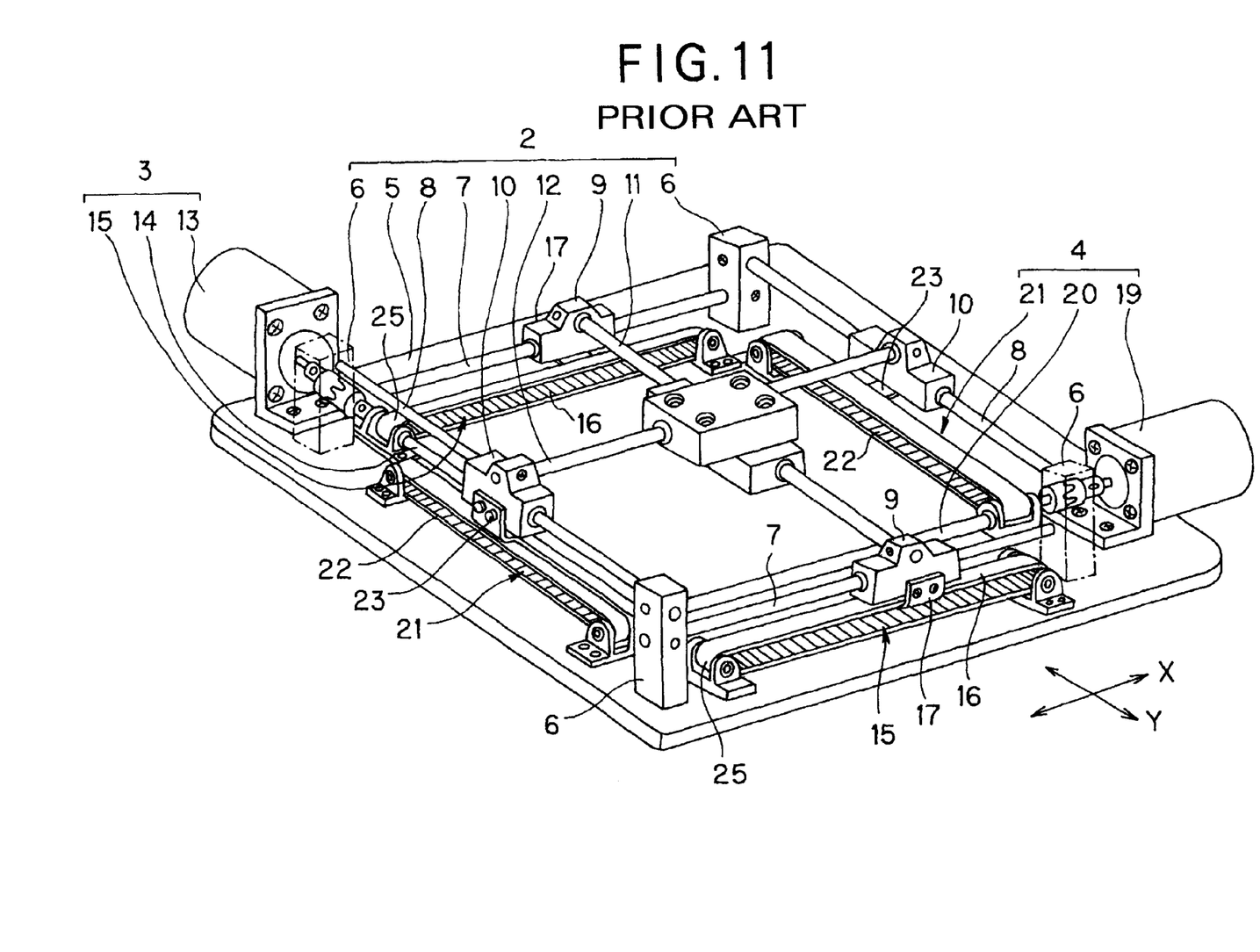
FIG. 11 is a perspective view of one example of an X-Y table having a conventional structure.

FIG. 11 shows a known plane-type X-Y table, having a conventional structure, a two-dimensional moving system for moving a table in a plane (for example, as disclosed in Japanese Patent Publication No. SHO 63-9477). Such X-Y table comprises a table 1, a guide mechanism 2 for guiding the table to be movable in a plane, an X-axis driving mechanism 3 and a Y-axis driving mechanism 4.

Further, it is to be noted that the terms "X-axis "Y-axis " and "Z-axis " used herein may be substituted with terms "X-directional", "Y-directional " and "Z-directional", in which X, Y and Z mean the axial directions (axes) normal to each other.

The guide mechanism 2 includes a base plate 5, columns (posts) 6, - - - , 6 disposed at four corner portions of the base plate 5, two X-axis slider shafts 7, 7 arranged in parallel between opposed two columns 6, 6, two Y-axis slider shafts 8, 8 arranged in parallel between other opposed two columns 6, 6, X-axis sliders 9, 9 mounted to the X-axis slider shafts 7, 7 to be slidable, Y-axis sliders 10, 10 mounted to the Y-axis sliders 8, 8 to be slidable, a Y-axis guide shaft 11 arranged between the X-axis sliders 9, 9, and an X-axis guide shaft 12 arranged between the Y-axis sliders 10, 10. Both the X-axis guide shaft 11 and Y-axis guide shaft 12 penetrate the table 1 so as to intersect to each other at right angles.

The X-axis driving mechanism 3 includes a Y-axis motor 13, a Y-axis driving shaft 14 connected to the Y-axis motor 13 and a pair of X-axis belt transmission devices 15, 15 fixed to the Y-axis driving shaft 14. Each of the X-axis belt transmission devices 15, 15 includes an X-axis belt 16, which is coupled to the X-axis slider 9 by means of bracket 17.

The Y-axis driving mechanism 4 includes an X-axis motor 19, an X-axis driving shaft 20 connected to the X-axis motor 19 and a pair of Y-axis belt transmission devices 21, 21 fixed to the X-axis driving shaft 14. Each of the Y-axis belt transmission devices 21, 21 includes an Y-axis belt 22, which is coupled to the Y-axis slider 10 by means of bracket 23.

Then, when the Y-axis motor 13 is driven to be rotated, the Y-axis driving shaft 14 is rotated, the X-axis belts 16, 16 are moved in the longitudinal direction thereof, and the X-axis sliders 9, 9 and the Y-axis guide shaft 11 are moved in the X-axis direction. According to such movement, the table 1 is moved in the X-axis direction. On the other hand, when the X-axis motor 19 is driven to be rotated, the X-axis driving shaft 20 is rotated, the Y-axis belts 22, 22 are moved in the longitudinal direction thereof, and the Y-axis sliders 10, 10 and the X-axis guide shaft 12 are moved in the Y-axis direction. According to such movement, the table 1 is moved in the Y-axis direction.

In the X-Y table of the structure mentioned above, the Y-axis guide shaft 11 is disposed between the X-axis belts 16, 16 extending in the X-axis direction, and when the Y-axis driving shaft 14 is driven to be rotated, the Y-axis guide shaft 11 is moved in the X-axis direction, and thereby, the table 1 is moved in the X-axis direction. On the other hand, the X-axis guide shaft 12 is disposed between the Y-axis belts 22, 22 extending in the Y-axis direction, and when the X-axis driving shaft 20 is driven to be rotated, the X-axis guide shaft 12 is moved in the Y-axis direction, and thereby, the table 1 is moved in the Y-axis direction.

However, in the conventional X-Y table of the structures mentioned above and shown, for example, in FIG. 11, there is a possibility that rotational angles of tandem pulleys 25, 25 of the belt transmission devices 15, 15 are changed at the driving time due to twisting (torsion) force of the Y-axis driving shaft 14, and the motion of one of the X-axis belts 16 disposed apart from the Y-axis motor 13 always delays from the motion of the other one of the X-axis belts 16 disposed near the Y-axis motor 13. Such delay of the motion also occurs on the Y-axis belts 22, 22. When the table 1 is moved at a highly accelerated speed, the twisting of the Y-axis driving shaft 14 and the X-axis driving shaft 20 is made large. Therefore, in the conventional X-Y table, it is impossible to move the table 1 at a highly accelerated speed.

Figure 12:
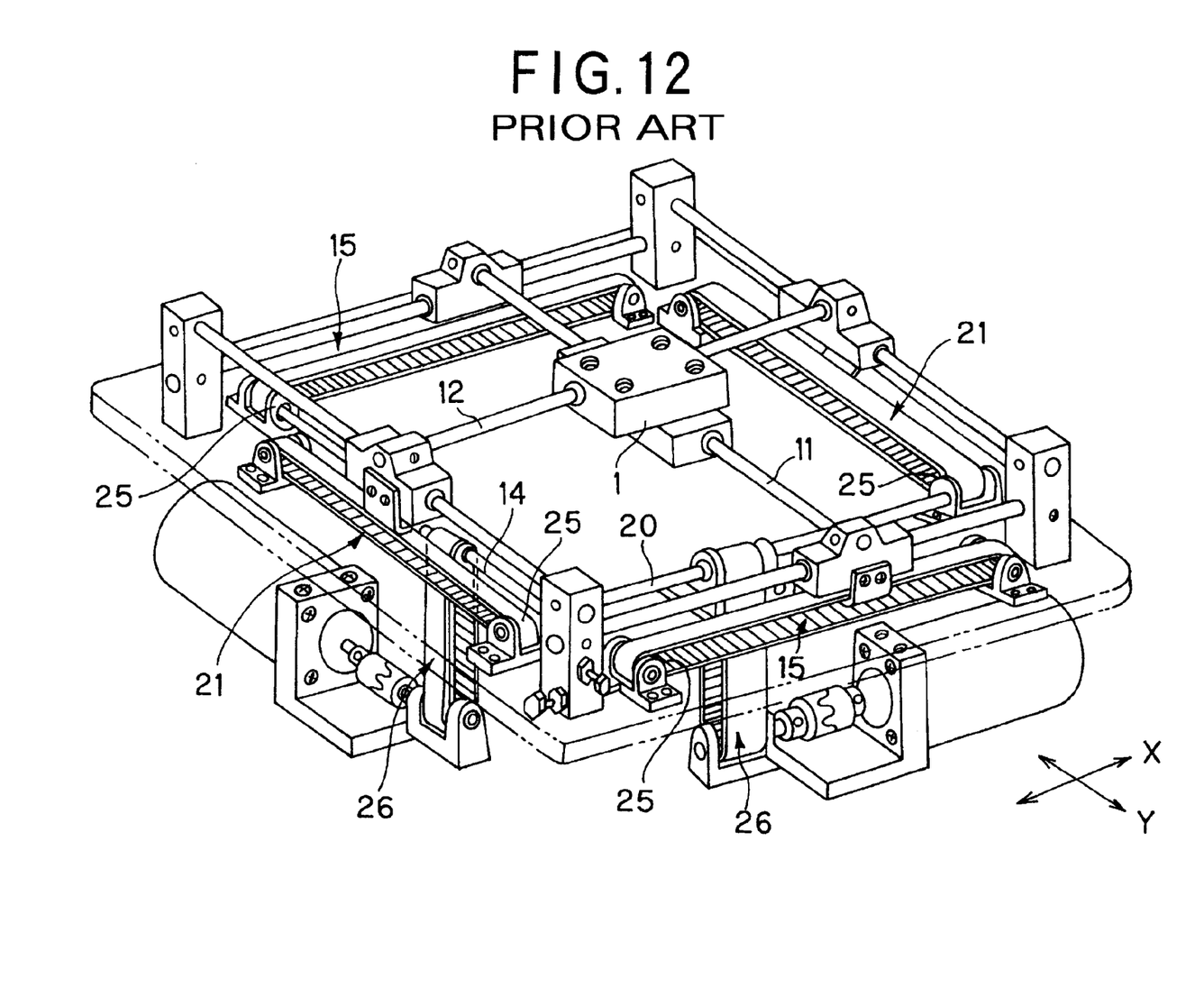
FIG. 12 is a perspective view of another example of an X-Y table having a conventional structure.

In order to solve such problem, the Japanese Patent Publication mentioned hereinbefore provides an X-Y table having structure, as shown in FIG. 12, that the Y-axis driving shaft 14 or X-axis driving shaft 20 is driven at a central portion between the tandem pulleys 25, 25 so as to make equal the twisting amounts thereof and, hence, to substantially eliminate variation or change of the rotational angles of the tandem pulleys 25, 25. In such X-Y table, central driving devices 26, 26 are arranged at a central portion between the parallel paired X-axis belt transmission devices 15, 15 and a central portion between the parallel paired Y-axis belt transmission devices 21, 21, respectively.

However, in the X-Y table in which the rotational angle variation between the tandem pulleys 25, 25 are eliminated, the central driving devices 26, 26 merely serve to distribute a driving force to or between the tandem belt transmission assemblies (including a pair of X-axis belt transmission devices 15, 15 and a pair of Y-axis belt transmission devices 21, 21), and in an actual arrangement, the driving force is applied to the central position between the tandem belt transmission assemblies. That is, the driving force is focused and concentrated on the central portion in the longitudinal direction between the X- and Y-axis guide shafts 12 and 11. For this reason, when the table 1 is shifted from the central portion between the tandem belt transmission assemblies, it is impossible to position the driving force on the central portion of the table 1. Therefore, in the case where the table 1 is not accurately positioned on the central portion of the tandem belt transmission assemblies, there will cause a yawing (YAW) moment to the peripheral support bearings, which will be described hereunder in detail.

Figure 13:
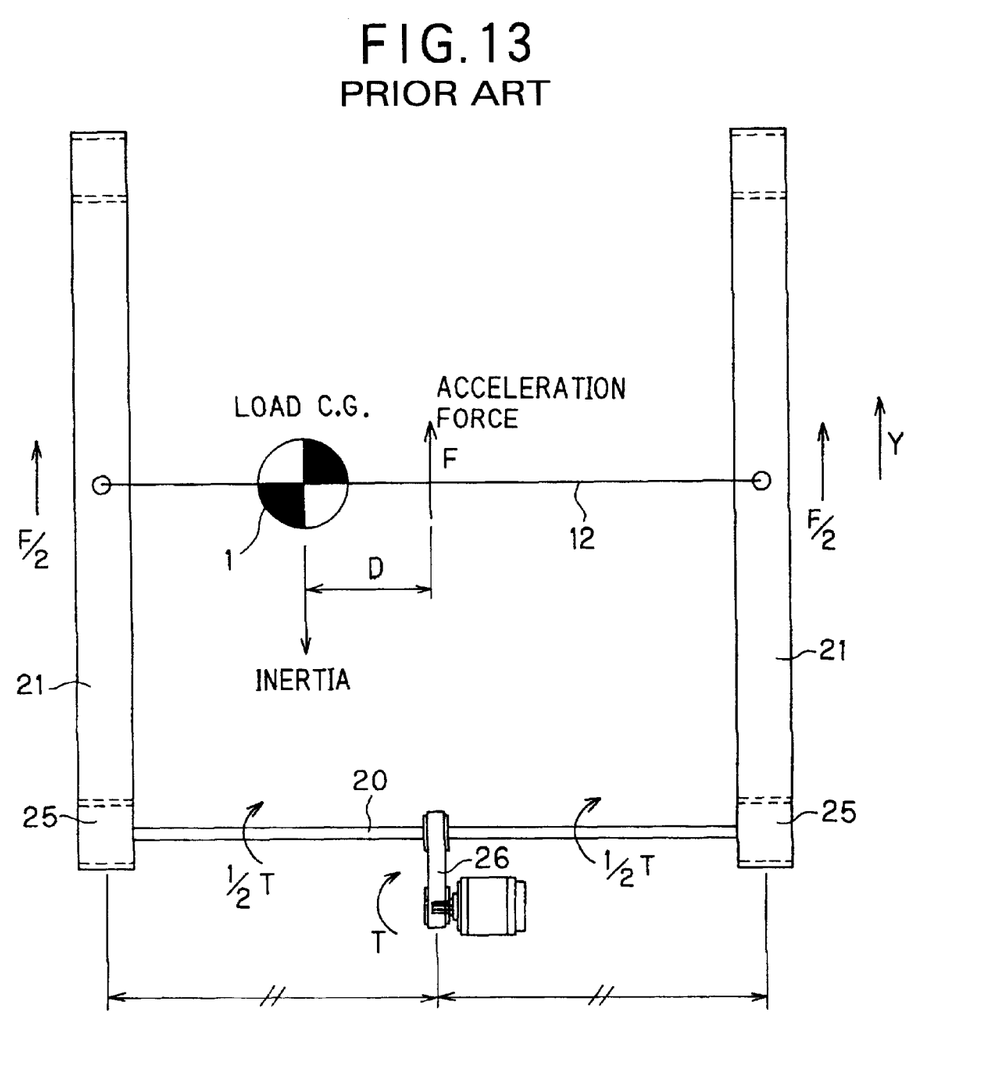
FIG. 13 a schematic view of an X-Y table of a further example of a conventional structure.

FIG. 13 shows a schematic arrangement of the X-Y table in which the rotational angle variation between the tandem pulleys 25, 25 is eliminated. With reference to FIG. 13, when the central driving device 26 drives the X-axis driving shaft 20, the tandem belt transmission assemblies 21, 21, and the X-axis guide shaft 12 is moved in the Y-axis direction. As shown in FIG. 13, the equally divided X-axis driving shaft 20 distributes a torque (T) equally to ½ torque (T/2) which equally balances a force of F/2 at both sides of the X-Y table. Finally, a composed force F is positioned on the central portion of the tandem belt transmission assemblies at both the sides of the X-Y table. When the table 1 is shifted from the central position by a distance D, since no means for controlling the supply of the torque exists on the closer side, the force F for acceleration is always applied to the central portion of the X-axis guide shaft 12. As a result, the yawing moment equal to F×D is caused. In the case where such yawing moment is caused, it becomes difficult to move the table 1 at the highly accelerated speed.

SUMMARY OF THE INVENTION

An object of the present invention is to substantially eliminate defects or drawbacks encountered in the prior art mentioned above and to provide a two-dimensional moving system capable of moving a table or like at a highly accelerated speed without causing any moment such as yawing moment and achieving a high moving (motion) performance, that is, capable of effectively concentrating the accelerated speed on the table regardless of the position of the table when moved.

This and other objects can be achieved according to the present invention by providing a two-dimensional moving system for moving a table in a plane comprising:

a table;

a guide mechanism for guiding the table to be movable in the plane;

first and second belt members which are connected to the table so as to intersect to each other at substantially right angles;

a first driving mechanism for driving the first belt members so as to move the table in a longitudinal direction of the first belt members and to allow the first belt members to be movable in a longitudinal direction of the second belt members; and a second driving mechanism for driving the second belt members so as to move the table in the longitudinal direction of the second belt members and to allow the second belt members to be movable in the longitudinal direction of the first belt members.

In the present invention, the first and second belt members each preferably comprises an annular endless member including, for example, timing belt, V-belt, chain or rope.

According to the present invention of the structure mentioned above, since the table is moved by driving the first and second belt members, the accelerated force can be effectively concentrated to the table regardless of the position of the table. Further, the moving load including the weight of the table and the load applied thereto is larger than a moving load preliminarily applied to a movable portion of the guide mechanism. However, according to the structure of the present invention, since any yawing moment is not caused, the table can be moved at a high acceleration speed, thus achieving the improved moving performance.

In a preferred embodiment of the present invention, the first driving mechanism comprises a pair of first pulleys provided for both end portions of the first belt members, a first spline shaft extending in parallel to the longitudinal direction of the second belt members so as to penetrate one of the first pulleys and a first driving source for driving the first spline shaft to be rotated, this one of the first pulleys being movable in an axial direction of the first spline shaft and being rotated thereby, and the second driving mechanism comprises a pair of second pulleys provided for both end portions of the second belt members, a second spline shaft extending in parallel to the longitudinal direction of the first belt members so as to penetrate one of the second pulleys and a second driving source for driving the second spline shaft to be rotated, this one of the second pulleys being movable in an axial direction of the second spline shaft and being rotated thereby.

According to this embodiment, the first belt member is rotated and the first belt member can be moved in the longitudinal direction of the second belt member. Furthermore, the second belt member is rotated and the second belt member can be moved in the longitudinal direction of the first belt member. The use of the spline shaft makes simple the structures of the first and second driving mechanisms, improving the reliability. Moreover, even if the driving sources are disposed at corner portions of the X-Y table for the sake of easy usage, the acceleration force can be concentrated to substantially the central portion of the table without using, for example, wrapping transmission member.

The pulleys may be timing pulleys and the belt members may be timing belts.

According to the use of the timing belt having less slip or noise, the table can be smoothly moved at a high acceleration speed and backlash is eliminated, thus improving the positioning performance.

In a further embodiment, the guide mechanism comprises a pair of first guide shafts extending in parallel to the longitudinal direction of the first belt members so as to guide the table to be movable, a pair of second guide shafts extending in parallel to the longitudinal direction of the second belt members so as to guide the table to be movable, a pair of first linear motion guides provided for both end portions of the first guide shafts and adapted to guide the linear motion of the first guide shafts in the longitudinal direction of the second belt members, and a pair of second linear motion guides provided for both end portions of the second guide shafts and adapted to guide the linear motion of the second guide shafts in the longitudinal direction of the first belt members, a pair of the first guide shafts being arranged on both sides of the first belt members and a pair of the second guide shafts being arranged on both sides of the second belt members.

According to this embodiment, since the paired first guide shafts are arranged on both sides of the first belt members and the paired second guide shafts are arranged on both sides of the second belt member, the table can be smoothly guided in a balanced state even if the table is moved at the highly accelerated speed.

In a further embodiment, each of the first pulleys is guided by each of the first linear motion guides so as to be linearly moved in the longitudinal direction of the second belt member and each of the second pulleys is guided by each of the second linear motion guides so as to be linearly moved in the longitudinal direction of the first belt members.

According to this embodiment, the motion of the table can accord with the motions of the first and second belt members, and hence, the table can be moved at the highly accelerated speed.

In a further embodiment, the first and second spline shafts are formed with ball rolling grooves extending in axial directions thereof, the above-mentioned one of the first pulleys and the above-mentioned one of the second pulleys are formed with ball circulation passages including ball rolling grooves corresponding respectively to the ball rolling grooves formed to the first and second spline shafts, and an outer sleeve is assembled to each of the first and second spline shafts to be linearly movable thereto and a number of balls housed and arranged in the ball circulation passage of the outer sleeve so as to circulate in accordance with the linear motion of the outer sleeve with respect to each of the first and second spline shafts.

According to this embodiment, the pulleys can be smoothly moved in the axial direction of the spline shafts through the rolling motion guide, and as a result, the table can be moved at the highly accelerated speed.

In a further embodiment, the linear motion guides each comprises a track shaft having a rolling member rolling surface, a slider member formed with a rolling member circulation passage including a loaded rolling member rolling surface corresponding to the rolling member rolling surface of the track shaft and assembled with the track shaft to be relatively movable, and a number of rolling members arranged in the rolling member circulation passage so as to circulate therein in accordance with the relative motion of the slider member with respect to the track shaft.

According to this embodiment, the motion of the linear motion guide device can be made smooth through the rolling motion of the rolling members, and hence, the guide shafts and the table can be moved at the highly accelerated speed.

In a further embodiment, the first and second belt members are coupled to substantially a central portion of the table in the plane.

According to such structure, the accelerated force can be more effectively concentrated to the central portion of the table, so that the table can be moved at the more highly accelerated speed.

In a further embodiment, the table comprises an upper table section and a lower table section which are shifted from each other in positions in a direction normal to the plane, and one of the first and second belt members is coupled to the upper table section and the other one thereof is coupled to the lower table section.

According to this embodiment, the belt attaching positions are shifted in the vertical direction, so that the interference between the first and second belt members can be prevented even if they intersect to each other.

The nature and further characteristic features of the present invention will be made more clear from the following descriptions made with reference to the accompanying drawings.

DESCRIPTION OF THE PREFERRED EMBODIMENTS

The present invention will be described hereunder with reference to the accompanying drawings.

Figure 1:
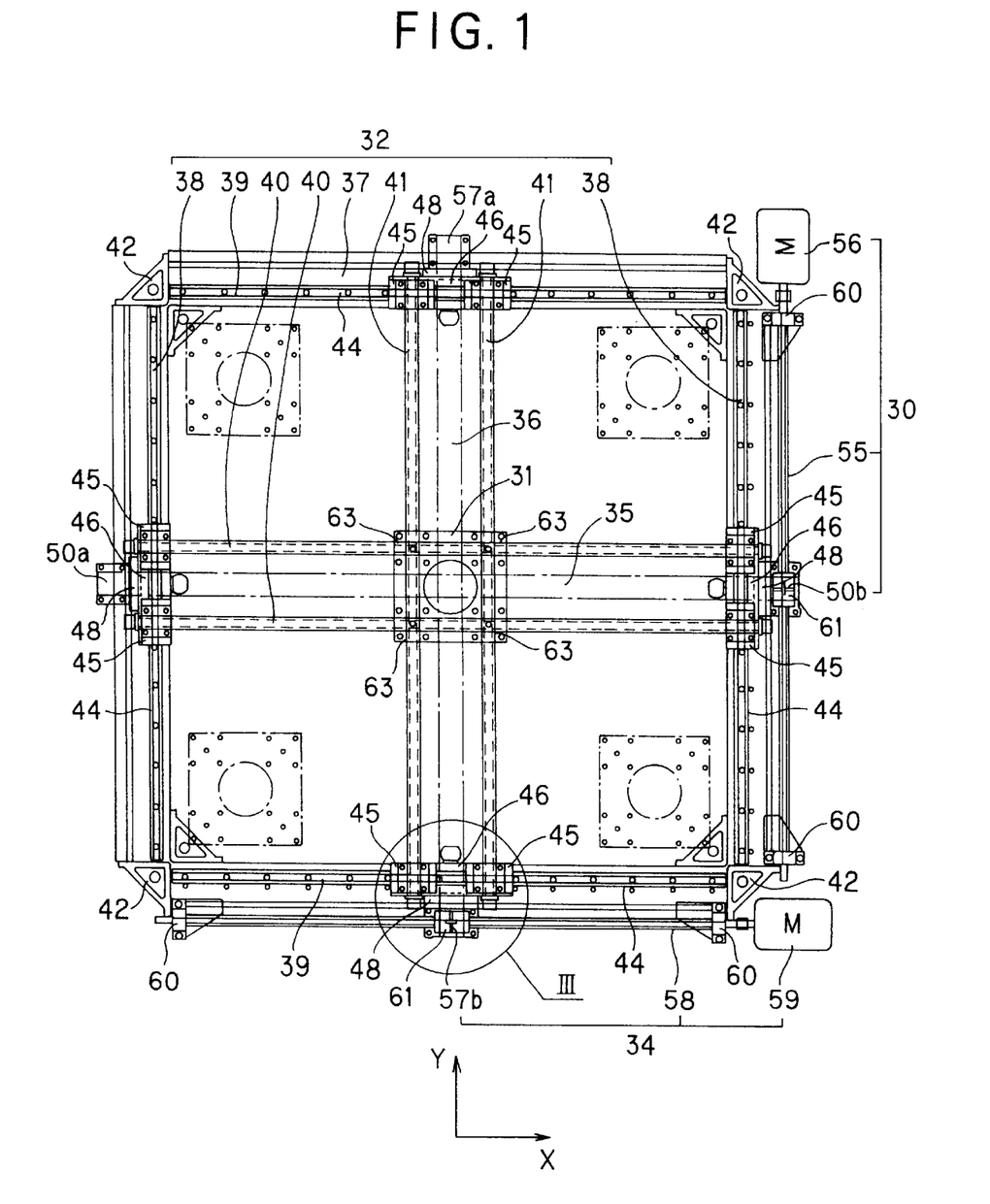
FIG. 1 is a plan view of a two-dimensional moving system according to one embodiment of the present invention.

FIGS. 1 to 4 represents a two-dimensional moving system according to one embodiment of the present invention. This two-dimensional moving system is used as X-Y table which moves a table in an X-direction (lateral direction in FIG. 1, for example,) and a Y-direction (vertical direction therein). As shown in FIG. 1, the two-dimensional moving system includes a table 31, a guide mechanism 33 for guiding the table 31 to be movable in a plane, an X-axis (directional) driving mechanism 33 for driving, i.e., moving, the table in the X direction and a Y-axis (directional) driving mechanism 34. At substantially the central portion in the plane of the table 1, an X-axis belt as first belt 35 and a Y-axis belt as second belt 36, which intersect at right angles to each other, are coupled together. In the two-dimensional moving system of this embodiment, the table 31 is directly driven and moved by such X-axis belt 35 and the Y-axis belt 36 so that an acceleration force can be effectively concentrated to substantially the central portion of the table 31 even if the table 31 is positioned at any portion. It is preferred that such X-axis belt 35 and the Y-axis belt 36 are formed from annular timing belts.

The guide mechanism 32 for guiding the table 31 to be movable in a plane comprises a frame 37 formed so as to provide a rectangular frame shape, Y-axis linear guides 38, 38 as first linear motion guide means fixed to two side portions in the Y-direction of the upper surface of the frame 37, X-axis linear guides 39, 39 as second linear motion guide means fixed to two side portions in the X-direction of the upper surface of the frame 37, a pair of X-axis guide shafts 40, 40 as first guide shafts disposed between the Y-axis linear guides 38, 38 so as to be parallel to the longitudinal direction of the X-axis belt 35, and a pair of Y-axis guide shafts 41, 41 as first guide shafts disposed between the X-axis linear guides 39, 39 so as to be parallel to the longitudinal direction of the Y-axis belt 36. The table 31 is guided to be movable in the X-direction by the paired X-axis guide shafts 40, 40 and in the Y-direction by the paired Y-axis guide shafts 41, 41.

Figure 2:
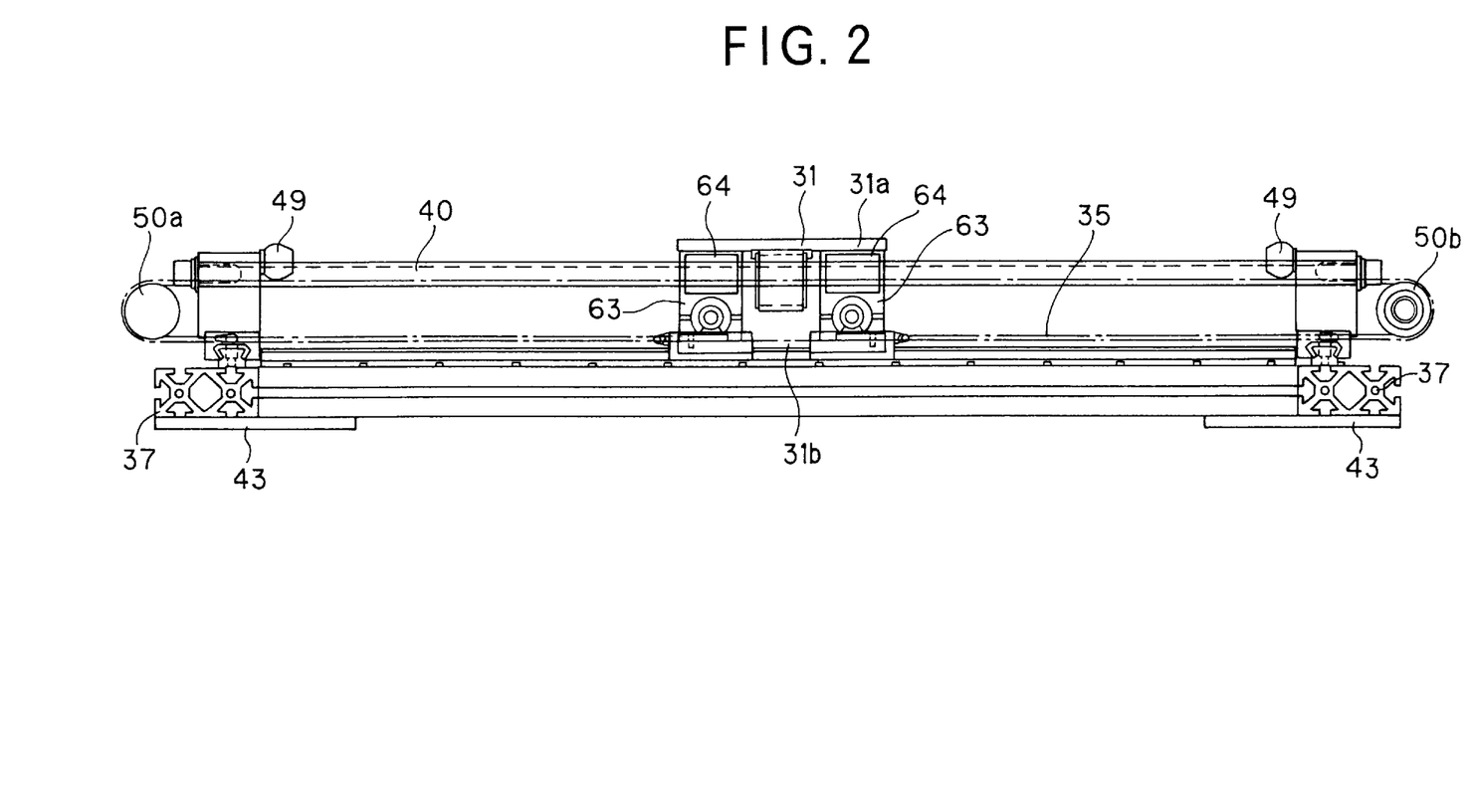
FIG. 2 is a side view of the two-dimensional moving system of FIG. 1.

The frame 37 is fabricated by arranging frame pieces, which are formed as aluminum product through extrusion molding, into substantially a square shape and connecting four corner portions of the square frame pieces by means of gussets 42, - - - , 42, for example. As shown in FIG. 2, the frame 37 is fixed on a frame mounting bracket 43.

Figure 3:
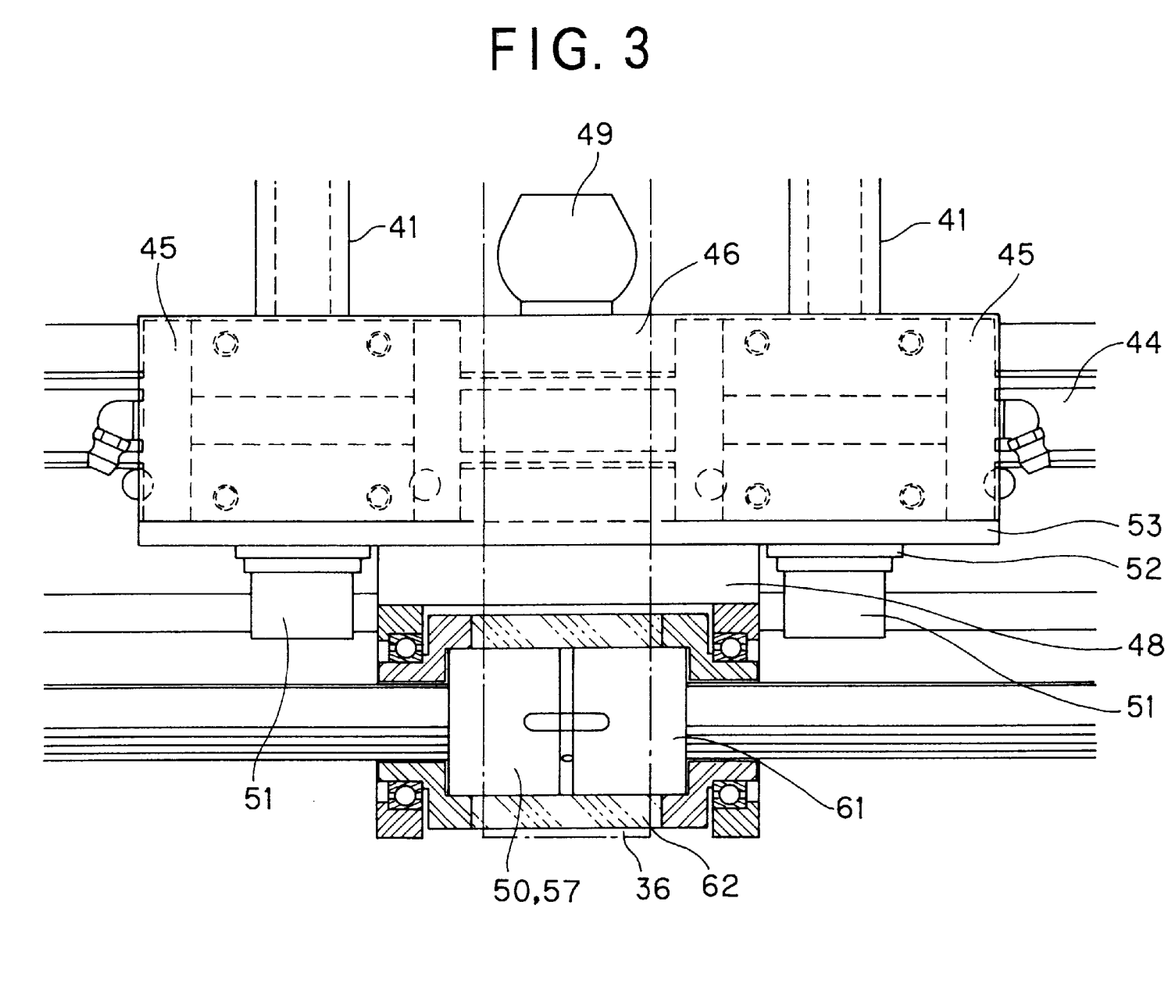
FIG. 3 is a view, in an enlarged scale, of an encircled portion III shown in FIG. 1.

With reference to FIGS. 1 and 2, the X-axis linear guides 39, 39 and the Y-axis linear guides 38, 38 are each provided with a track rail 44 as a track shaft having a long scale and two slider members 45, 45 sliding along the track rail 44. Further, as shown in FIG. 3, two slider members 45, 45 are coupled together by means of connection (coupling) plate 46. The details of the structures of such track rail 44 and slider members 45, 45 will be mentioned hereinlater. A pulley 50 is mounted to the outside portion of the connection plate 46 through a pulley mounting plate 48 also mentioned hereinlater, and a shock absorber cushion 49 for absorbing an impact energy of the table 31 is also mounted to the inside portion of the connection plate 46.

Referring to FIG. 1, a pair of X-axis guide shafts 40, 40 extending in parallel to the longitudinal direction of the X-axis belt 35 have both end portions to which a pair of Y-axis linear guides 38, 38 are mounted so as to guide the linear motion in the Y-direction of the X-axis guide shafts 40, 40. Furthermore, a pair of Y-axis guide shafts 41, 41 extending in parallel to the longitudinal direction of the Y-axis belt 36 have both end portions to which a pair of Y-axis linear guides 39, 39 are mounted so as to guide the linear motion in the X-axis direction of the Y-axis guide shafts 41, 41.

Figure 4:
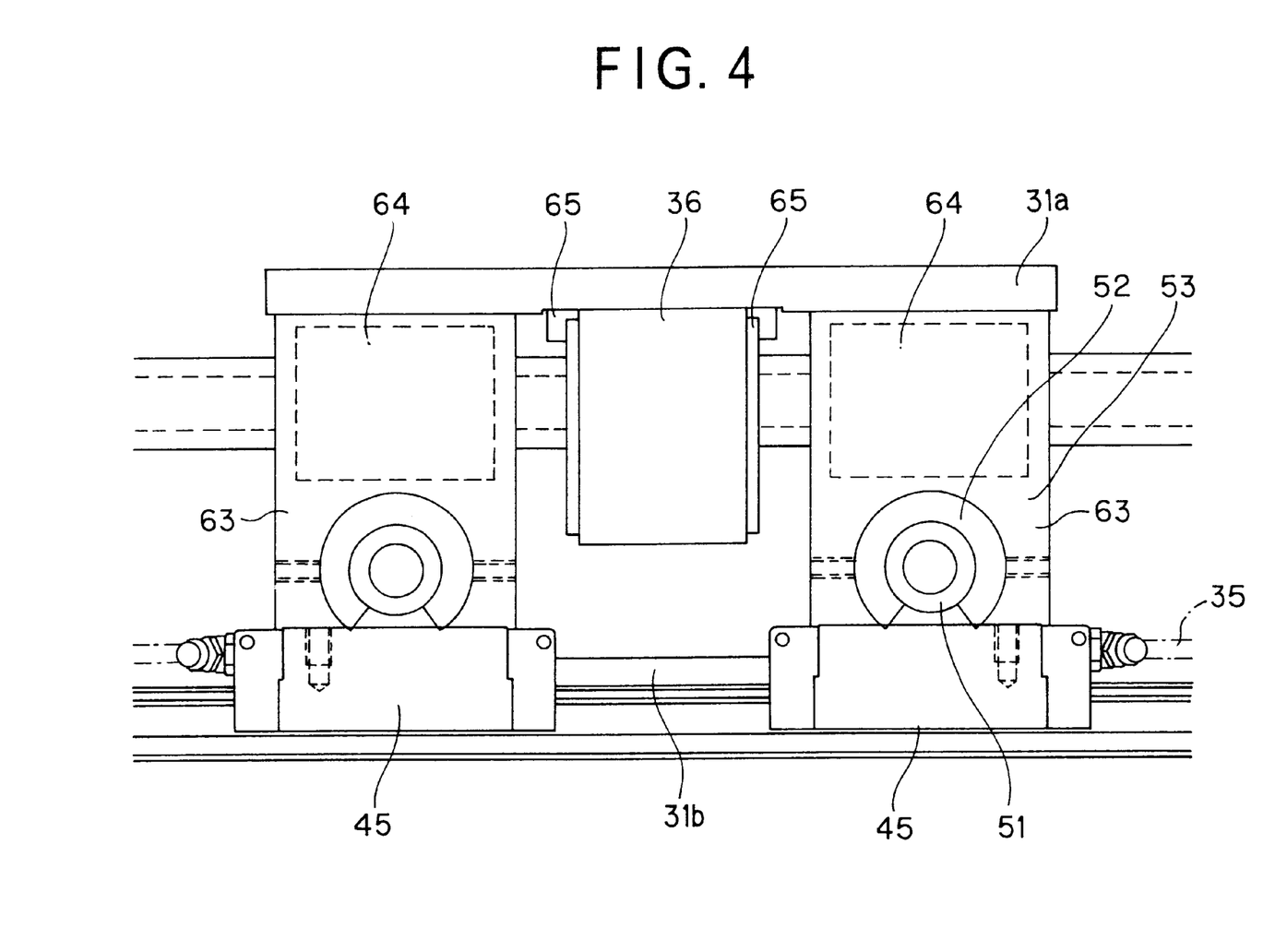
FIG. 4 is a side view of FIG. 3.

The paired X-axis guide shafts 40, 40 are on both the side portions of the X-axis belt 35 with equal distance in the Y-axis direction, and the paired Y-axis guide shafts 41, 41 are on both the side portions of the Y-axis belt 36 with equal distance in the X-direction. These X-axis guide shafts 40, 40 and Y-axis guide shafts 41, 41 are composed of hollow shafts having inner hollow structures and attached to the connection plates 46, 46 so as to adjust a tension. That is, as shown in FIGS. 3 and 4, each of both the end portions of these X-axis guide shafts 40, 40 and Y-axis guide shafts 41, 41 is attached to the connection plate 46 through tension adjusting bolts 51, 51, a split bush 52 and a tension adjusting bracket 53. According to this structure, the tensions of the X-axis guide shafts 40, 40 and the Y-axis guide shafts 41, 41 can be adjusted by the tension adjusting bolts 51, 51, respectively.

With reference to FIG. 1, the X-axis driving mechanism 33 as the first driving mechanism comprises a pair of X-axis pulleys 50a, 50b mounted to both end portions of the X-axis belt 35, a Y-axis spline shaft 55 as a first spline shaft extending in the Y-axis direction and a Y-axis motor 56 such as stepping motor or like as a first driving source for rotating the Y-axis spline shaft 55, which penetrates one 50b of the X-axis pulleys 50a, 50b. This one X-axis pulley 50b is made movable in the axial direction of the Y-axis spline shaft 55 to be rotatable thereby.

The Y-axis driving mechanism 34 as the second driving mechanism comprises a pair of Y-axis pulleys 57a, 57b mounted to both end portions of the Y-axis belt 36, a X-axis spline shaft 58 as a second spline shaft extending in the X-axis direction and an X-axis motor 59 such as stepping motor or like as a second driving source for rotating the X-axis spline shaft 58, which penetrates one 57b of the Y-axis pulleys 57a, 57b. This one Y-axis pulley 57b is made movable in the axial direction of the X-axis spline shaft 58 to be rotatable thereby.

The X-axis driving mechanism 33 drives the X-axis belt 35 to be rotated to allow the table 31 to move in the longitudinal direction (X-axis direction) of the X-axis belt 35 and also allow the X-axis belt 35 to move in the longitudinal direction (Y-axis direction) of the Y-axis belt 36. Further, the Y-axis driving mechanism 34 drives the Y-axis belt 36 to be rotated to allow the table 31 to move in the longitudinal direction of the Y-axis belt 36 and also allow the Y-axis belt 36 to move in the longitudinal direction of the X-axis belt 35.

The X-axis spline shaft 58 and the Y-axis spline shaft 55 are supported to be rotatable at both ends thereof by support brackets 60, 60 through radial bearings. The support brackets 60, 60 are mounted to the corner portions of the frame 37.

As shown in FIGS. 1 and 3, a pair of X-axis pulleys 50a, 50b and a pair of Y-axis pulleys 57a, 57b comprises timing pulleys, which are mounted to pulley mounting plates 48, - - - , 48 mounted and supported to the side surfaces of the connection plates 46, 46 so as to be rotatable through radial bearings, respectively.

The respective X-axis pulleys 50a, 50b are guided by the Y-axis linear guides 38, 38 to be linearly movable in the Y-axis direction, and the respective Y-axis pulleys 57a, 57b are guided by the X-axis linear guides 39, 39 to be linearly movable in the X-axis direction. The X-axis pulley 50b and the Y-axis pulley 57b are formed in combination of outer sleeves 61, 61 and gears 62, 62, respectively.

As shown in FIGS. 1, 2 and 4, the table 31 is provided with an upper side table section 31a and a lower side table section 31b which are shifted from each other in positions in a direction (Z-axis direction) normal to the X-Y plane. The upper side table section 31a and the lower side table section 31b are coupled together through bush housings 63, - - - , 63 arranged to four corners of the table 31. The paired X-axis guide shafts 40, 40 and the paired Y-axis guide shafts 41, 41 penetrate the bush housings 63, - - - , 63. Furthermore, ball bushes 64, - - - , 64 are provided for the X-axis guide shafts 40, 40 and the Y-axis guide shafts 41, 41 at portions penetrating the bush housings 63, - - - , 63 so as to enable the table to be smoothly movable with respect to the X-axis guide shafts 40, 40 and the Y-axis guide shafts 41, 41, respectively.

As shown in FIG. 4, the Y-axis belt 36 is fastened at its upper end side to the lower surface of the upper table section 31a by the belt mounting plates 65, 65, and further, the X-axis belt 35 is also fastened at its lower end side to the upper surface of the lower table section 31b by the belt mounting plates, not shown. Further, the upper side of the annular X-axis belt 35 passes through the annular Y-axis belt 36.

Figure 5:
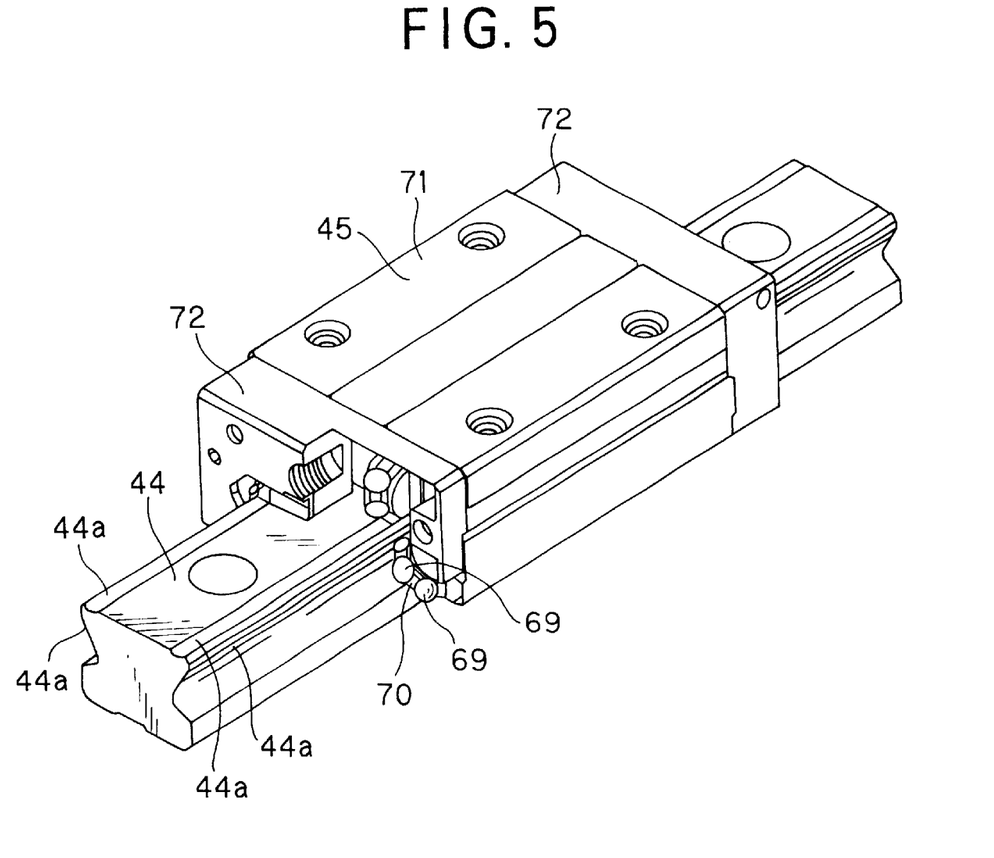
FIG. 5 is a perspective view, partially including a sectional portion, of a linear guide.
Figure 6:
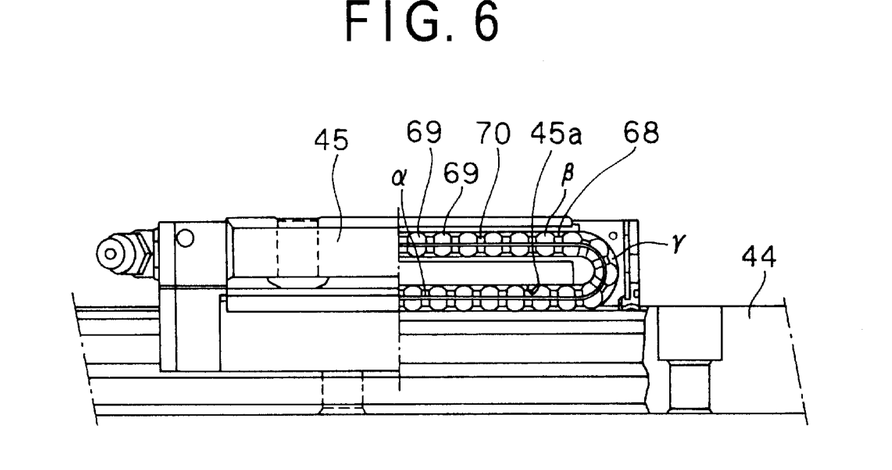
FIG. 6 is a side view of the linear guide including a longitudinal sectional view of a guide rail.

FIGS. 5 and 6 show the track rail 44 and the slider member 45 constituting the linear guides 38, 39. The linear guides 38 and 39 are disposed on the frame 37 and each comprises the track rail 44 (track shaft) formed with a ball rolling groove 44a as a rolling member rolling surface so as to extend in the longitudinal direction thereof, the slider member 45 assembled to the track rail 44 to be relatively movable and a number of balls 69, - - - , 69 as rolling members. The slider member 45 is formed with a ball circulation passage 68 (rolling member circulation passage) including a loaded ball rolling groove 45a as a loaded rolling surface corresponding to the ball rolling groove 44a formed to the track rail 44, and the balls 69 endlessly circulate in the ball circulation passage 68 in association with the relative motion of the slider member 45 with respect to the track rail 44. According to the endless circulation of the balls 69, the slider member 45 supporting the table 31 moves linearly along the track rail 44. The respective balls 69 are held to be rotatable and slidable by retainer means 70. The balls may be substituted with rollers as rolling members.

The track rail 44 is composed of a linear long member and has substantially a rectangular sectional shape. The ball rolling grooves 44a are formed on the upper surface and to both side surfaces of the track rail 44 so as to extend in its longitudinal direction along which the balls 69 are rolled. Two ball rolling grooves 44a, totally, four grooves, are formed on left and right side portions of the track rail 44, respectively. That is, for example, on the left side, one ball rolling groove 44a is formed on the left side upper surface of the track rail 44 and one ball rolling groove is formed on the left side side surface thereof.

The slider member 45 comprises a block body 71 and a pair of end covers 72, 72 disposed to both end sides of the block body 71 and fastened thereto by means of bolts. The block body 71 is formed with four loaded rolling member rolling grooves 45a opposing to the ball rolling grooves 44a, respectively, and the opposing ball rolling grooves 44a and 45a constitute, when they are assembled, a loaded ball rolling passage α, that is, four loaded ball rolling passages are formed between the track rail 44 and the slider member 45. Furthermore, four ball return passages β are formed to the movable member so as to extend in parallel to the corresponding loaded ball rolling passages α, and rolling direction changing passages γ connecting the loaded ball rolling passages α and the ball return passages β, respectively, are also formed to the movable member, and one ball circulation passage 68 is constituted by one loaded ball rolling passage α, one return passage β and two rolling direction changing passages γ.

Figure 7:
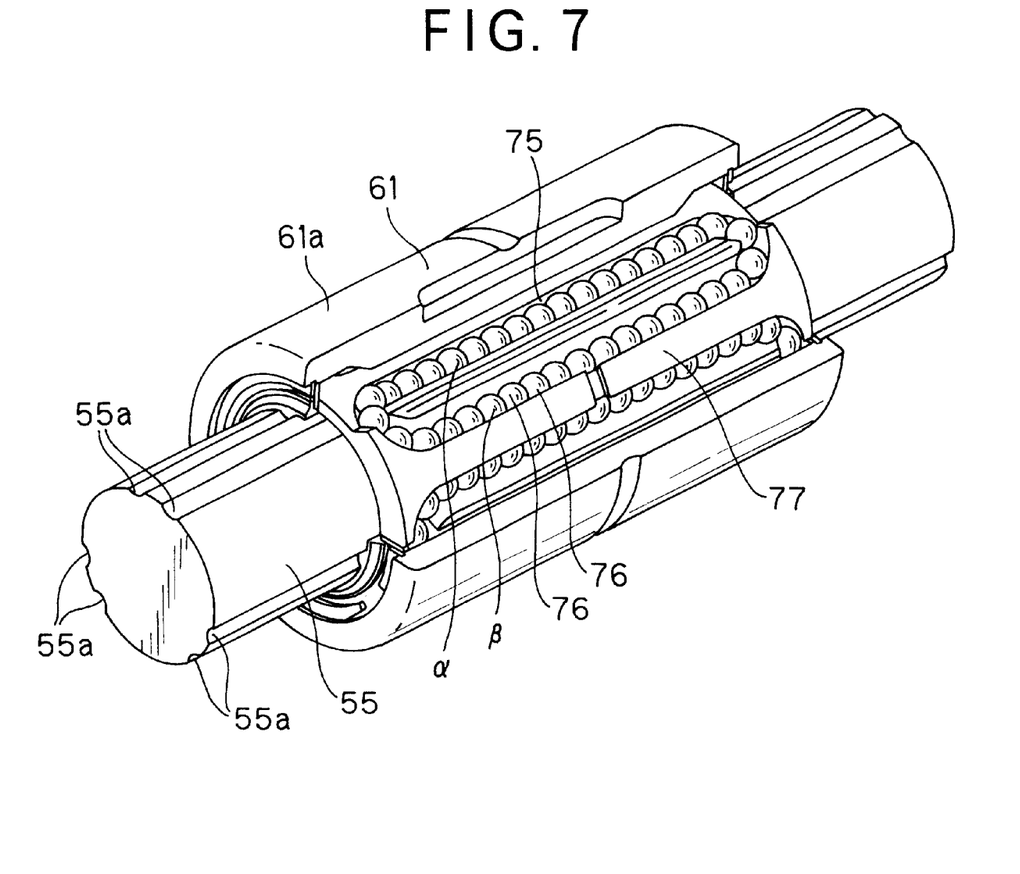
FIG. 7 is a perspective view, partially including a sectional portion, of X-axis or Y-axis spline shaft and an outer sleeve thereof.
Figure 8:
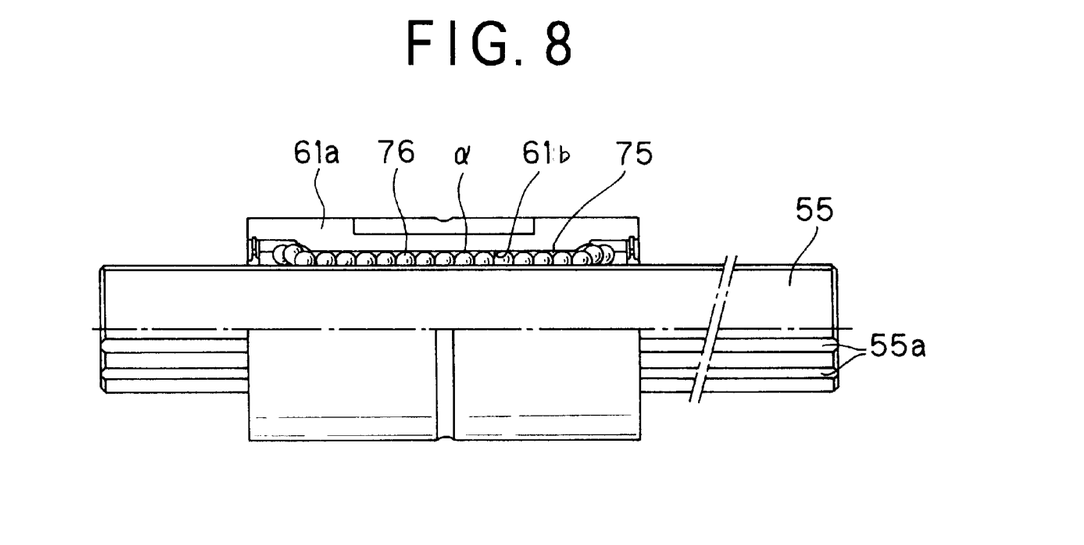
FIG. 8 is a side view of the X-axis or Y-axis spline shaft, partially including an axial sectional view of the spline shaft.

FIGS. 7 and 8 show an example of the X-axis spline shaft 58 and the outer sleeve 61 mounted thereto. Although only the X-axis spline shaft 58 is explained herein, the Y-axis spline shaft 55 has substantially the same structure.

The X-axis spline shaft 58 is formed with, for example, six ball rolling grooves 55a extending in the axial direction thereof. The outer sleeve 61 is assembled to the X-axis spline shaft 58 to be linearly movable and comprises a sleeve body 61a formed with ball circulation passages 75 including ball rolling grooves 61a opposing to the ball rolling grooves 55a formed to the spline shaft 58, a number of balls 76, - - -, 76 which are housed and arranged in the ball circulation passage 75 and circulate therein in accordance with the relative linear motion of the outer sleeve 61 with respect to the X-axis spline shaft 58, and retainers 77 assembled to the sleeve body 61a so as to align and hold the balls 76 in the ball circulation passages 75.

Further, a ball rolling groove 61b is formed to the inner peripheral surface of the sleeve body 61a, as the track for the balls 76, so as to extend in the axial direction thereof, and the loaded ball rolling groove α is formed by the combination of the ball rolling groove 55a formed to the X-axis spline shaft 55 and the ball rolling groove 61b formed to the sleeve body 61a. A non-loaded ball return passage β, in which the balls 76 released from the load are circulated, is formed adjacent to the loaded ball rolling passage α.

According to the structure mentioned above, when the outer sleeve 61 is moved relatively to the X-axis spline shaft 55, the balls 76 roll in the loaded rolling passage a under the loaded state and, then, return to the non-loaded return passage β disposed adjacent to the loaded rolling passage α thus endlessly circulating in the circulation passage in shape of circuit.

Figure 9:
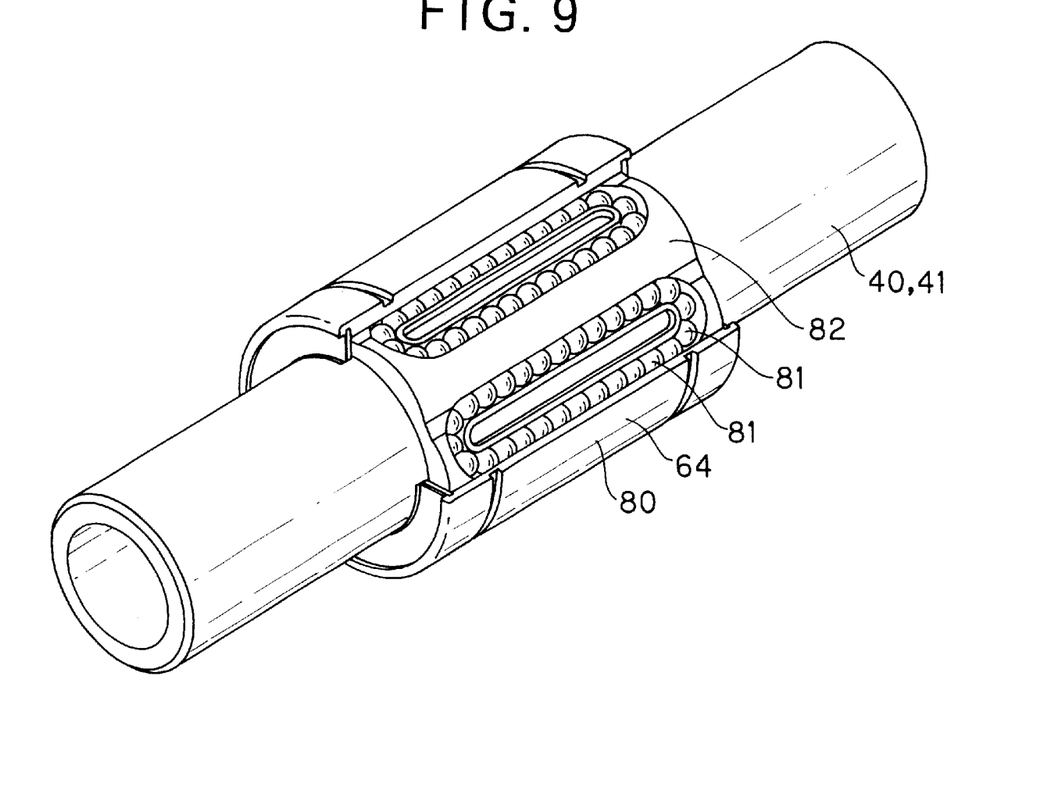
FIG. 9 is a perspective view, partially including a sectional portion, of X-axis or Y-axis guide shaft and a ball bush.
Figure 10:
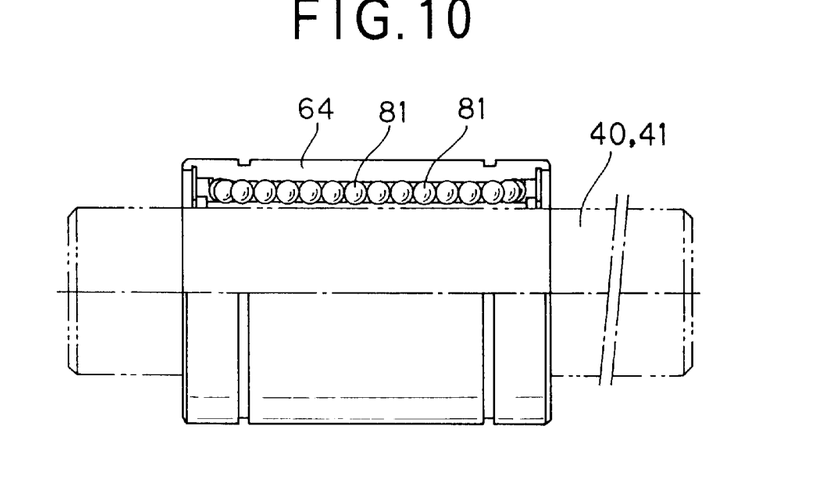
FIG. 10 is a side view, partially including an axial sectional portion, of the ball bush.

FIGS. 9 and 10 show the X-axis guide shaft 40 (Y-axis guide shaft 41) and the ball bush 64 in an assembled state. The ball bush 64 is assembled with the X-axis guide shaft 40 or Y-axis guide shaft 41 to be relatively linearly movable thereto. The ball bush 64 comprises an outer sleeve 80 formed with a ball circulation passage, a number of balls 81, - - -, 81, as rolling members which are housed and arranged in the ball circulation passage 75 and circulate therein in accordance with the relative linear motion of the outer sleeve 80 with respect to the X-axis guide shaft 40 or Y-axis guide shaft 41, and retainers 82 assembled to the outer sleeve 80 so as to align and hold the balls 81 in the ball circulation passages. When the ball bush 64 is relatively linearly moved with respect to the X-axis guide shaft 40 or Y-axis guide shaft 41, the balls 81 circulate in the ball circulation passage, including the loaded ball rolling passage, between the surface of the X-axis guide shaft 40 (Y-axis guide shaft 41) and the outer sleeve 80.

As shown in FIG. 1, when the Y-axis motor 56 is driven, the X-axis spline shaft 55 is rotated, then, the X-axis belt 35 is driven to be rotated and the table 31 fixed to the X-axis belt 35 is moved in the X-axis direction. In this operation, the Y-axis belt 36 connected to the table 31 is also moved in the X-axis direction under the guidance of the X-axis linear guide. On the other hand, when the X-axis motor 59 is driven, the Y-axis spline shaft 58 is rotated, then, the Y-axis belt 36 is driven to be rotated and the table 31 fixed to the Y-axis belt 36 is moved in the Y-axis direction. In this operation, the X-axis belt 35 connected to the table 31 is also moved in the Y-axis direction under the guidance of the Y-axis linear guide. According to such structure and operation of the present invention, the table is moved in the X and/or Y directions.

Furthermore, according to the present invention, since the table 31 is driven through the driving of the X-axis belt 35 and the Y-axis belt 36, which are directly connected to the table 31, the acceleration force can be effectively concentrated to the central portion of the table 31 regardless of the position of the table 31.

Therefore, according to such structure, no yawing moment is caused, and hence, the table can be moved at a highly accelerated speed with high performance.

It is to be noted that the present invention is not limited to the described embodiments and many other changes and modifications may be made without departing from the scopes of the appended claims.

What is claimed is:

1. A two-dimensional moving system for moving a table in a plane comprising:

a table;

a guide mechanism for guiding the table to be movable in the plane;

a first and second belt means which are connected to the table so as to intersect to each other at substantially right angles;

a first driving mechanism for driving the first belt means so as to move the table in a longitudinal direction of the first belt means and to allow the first belt means to be movable in a longitudinal direction of the second belt means; and a second driving mechanism for driving the second belt means so as to move the table in a longitudinal direction of the second belt means and to allow the second belt means to be movable in a longitudinal direction of the first belt means, wherein mechanical force for driving the first and second belt means is provided by motors, and wherein movement of the table does not require translational movement of the motors.

2. A two-dimensional moving system according to claim 1, wherein said first driving mechanism comprises a pair of first pulleys provided for both end portions of the first belt means, a first spline shaft extending in parallel to the longitudinal direction of the second belt means so as to penetrate one of the first pulleys and a first driving source for driving the first spline shaft to be rotated, said one of the first pulleys being movable in an axial direction of the first spline shaft and being rotated thereby, and wherein said second driving mechanism comprises a pair of second pulleys provided for both end portions of the second belt means, a second spline shaft extending in parallel to the longitudinal direction of the first belt means so as to penetrate one of the second pulleys and a second driving source for driving the second spline shaft to be rotated, said one of the second pulleys being movable in an axial direction of the second spline shaft and being rotated thereby.

3. A two-dimensional moving system according to claim 2, wherein said pulleys are timing pulleys and said belt means are timing belts.

4. A two-dimensional moving system according to claim 2, wherein said guide mechanism comprises a pair of first guide shafts extending in parallel to the longitudinal direction of the first belt means so as to guide the table to be movable, a pair of second guide shafts extending in parallel to the longitudinal direction of the second belt means so as to guide the table to be movable, a pair of first linear motion guide means provided for both end portions of the first guide shafts and adapted to guide the linear motion of the first guide shafts in the longitudinal direction of the second belt means, and a pair of second linear motion guide means provided for both end portions of the second guide shafts and adapted to guide the linear motion of the second guide shafts in the longitudinal direction of the first belt means, a pair of said first guide shafts being arranged on both sides of the first belt means and a pair of said second guide shafts being arranged on both sides of the second belt means.

5. A two-dimensional moving system according to claim 4, wherein each of said first pulleys is guided by each of said first linear motion guide means so as to be linearly moved in the longitudinal direction of the second belt means and each of said second pulleys is guided by each of said second linear motion guide means so as to be linearly moved in the longitudinal direction of the first belt means.

6. A two-dimensional moving system according to claim 4, wherein said first and second spline shafts are formed with ball rolling grooves extending in axial directions thereof, said one of the first pulleys and said one of the second pulleys are formed with ball circulation passages including ball rolling grooves corresponding respectively to the ball rolling grooves formed to the first and second spline shafts, and wherein an outer sleeve is assembled to each of the first and second spline shafts to be linearly movable thereto and a number of balls housed and arranged in the ball circulation passage of the outer sleeve so as to circulate in accordance with the linear motion of the outer sleeve with respect to each of the first and second spline shafts.

7. A two-dimensional moving system according to claim 4, wherein said linear motion guide means each comprises a track shaft having a rolling member rolling surface, a slider member formed with a rolling member circulation passage including a loaded rolling member rolling surface corresponding to the rolling member rolling surface of the track shaft and assembled with the track shaft to be relatively movable, and a number of rolling members arranged in the rolling member circulation passage so as to circulate therein in accordance with the relative motion of the slider member with respect to the track shaft.

8. A two-dimensional moving system according to claim 1, wherein said first and second belt means are coupled to substantially a central portion of the table in the plane.

9. A two-dimensional moving system according to claim 1, wherein said table comprises an upper table section and a lower table section which are shifted from each other in positions in a direction normal to the plane, and one of said first and second belt means is coupled to the upper table section and the other one thereof is coupled to the lower table section.

* * * * *